7285X
A. Myers,
Reciprocating Saw Mill,
Patented Nov. 9, 1832.
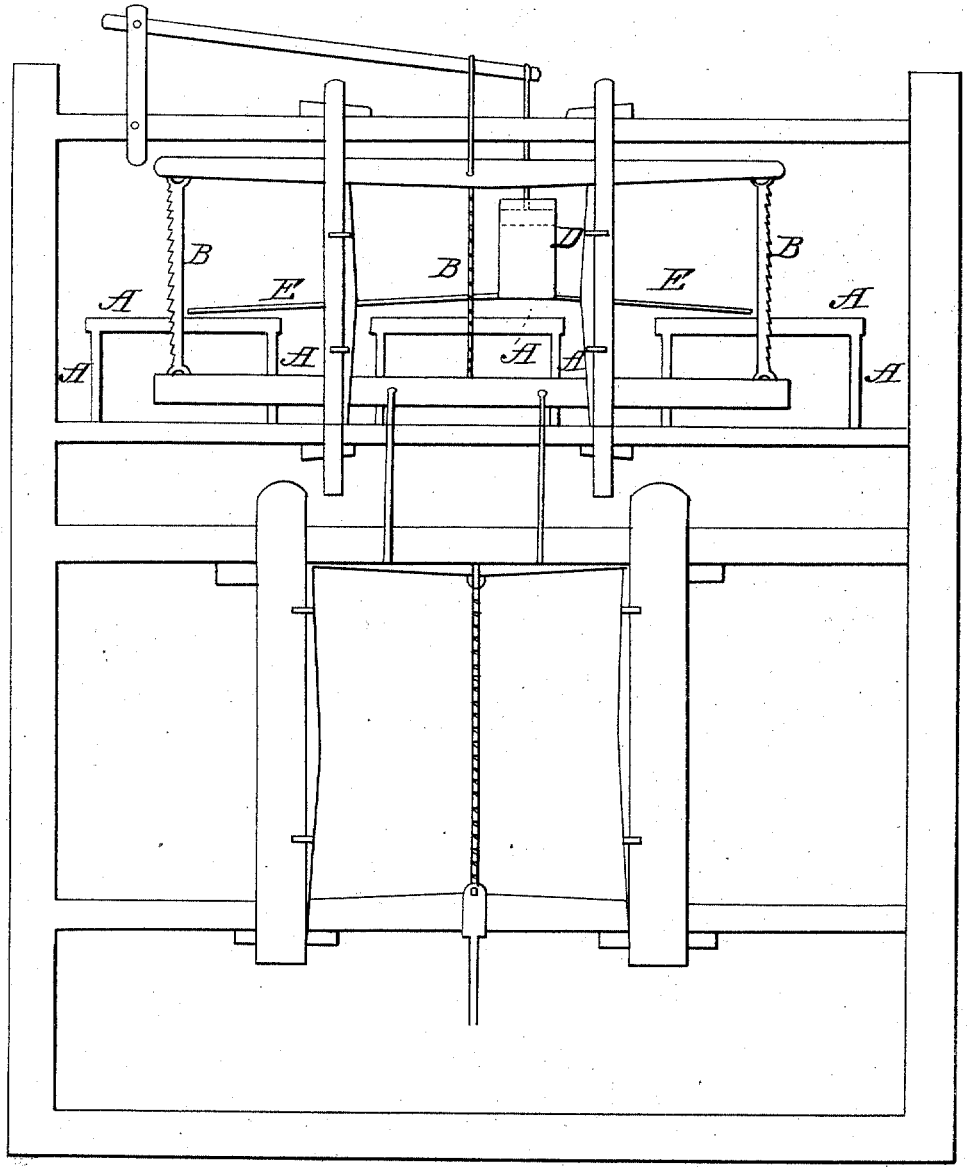
A.M. PHOTO-LITHO. CO. N.Y. (OSBORNE'S PROCESS)

X7285 Nov 9, 1832 Nov. 9, 1832 541

Abraham Myers of Washington County, Maryland
Letters Patent.

The Schedule referred to in these Letters Patent and making part of the same containing a description in the words of the said Abraham Myers himself of his improvement in the machine for sawing Gun stocks.

Be it known that I, Abraham Myers of Washington County State of Maryland have made an improvement in the machine for saw-ing Gun Stocks, which is described as follows.

The improvement consists of the platform and standards to secure the Gun stocks; the saws, and the bellows to blow away the dust.

The platform is about two feet in front and seven feet behind; there are three distinct partitions, each about two feet. This platform is supported by four or more stanchions or posts, resting on the floor of the saw mill. There are two saws which work lengthwise of the machine, and one which works crosswise for sawing off the ends of the Gun stocks. These saws are attached to and worked by a com-mon saw mill [illegible] them. A bellows having two pipes, is put above the platform on which the Gunstocks are placed not touch-ing it, but leaving room for the stuff to pass under.

This bellows is of a [illegible] or parallelogram [illegible], having two pipes, one for each saw working lengthwise for blowing away the dust and is worked by the crank of the saw mill. Operation. The stock [illegible]-ing first marked off is held in the hand, whilst the saw [illegible] off the [illegible] [illegible] The improvement which I claim and desire to be secured by Letters Patent is the before described method of sawing gun stocks particularly the platform on which they are placed, the ar-rangement of the saws for sawing them and the bellows for blowing off the dust. For a [illegible] illustration of my invention I refer to the model and drawing of the same deposited in the Patent office.

In testimony whereof I have hereunto subscribed my name before two witnesses this 24th day of October 1832

Witnesses { Wm. P. Elliot
{ Richd. Wendling (3[illegible] [illegible])

Abraham Myers

Exd.
[illegible]

(Patented Nov. 9, 1832) [illegible]